United States Patent [19]

Parker et al.

[11] 4,205,012
[45] May 27, 1980

[54] MANUFACTURE OF AMINES FROM ALCOHOLS WITH ZEOLITE FU-1 CATALYSTS

[75] Inventors: David G. Parker; Alan J. Tompsett, both of Middlesbrough, England

[73] Assignee: Imperial Chemical Industries Limited, London, England

[21] Appl. No.: 31,604

[22] Filed: Apr. 19, 1979

[30] Foreign Application Priority Data

Apr. 21, 1978 [GB] United Kingdom ............... 15865/78

[51] Int. Cl.² ............................................. C07C 85/06
[52] U.S. Cl. ............................. 260/583 J; 252/455 Z; 260/448 C; 260/583 R; 260/585 B; 423/328
[58] Field of Search ............. 260/583 J, 583 R, 585 B, 260/448 C; 423/328–330; 252/431 N, 455 Z

[56] References Cited

U.S. PATENT DOCUMENTS

| | | | |
|---|---|---|---|
| 3,384,667 | 5/1968 | Hamilton | 260/585 B |
| 3,849,463 | 11/1974 | Dwyer et al. | 260/448 C |
| 4,021,447 | 5/1977 | Rubin et al. | 423/328 X |
| 4,060,590 | 11/1977 | Whittam et al. | 423/328 |
| 4,082,805 | 4/1978 | Kaeding | 260/585 B |

FOREIGN PATENT DOCUMENTS 1117568 6/1968 United Kingdom ..................... 423/328

OTHER PUBLICATIONS

Aiello et al., "J. Chem. Soc.", (A), pp. 1470–1475, (1970).

*Primary Examiner*—John Doll
*Attorney, Agent, or Firm*—Cushman, Darby & Cushman

[57] ABSTRACT

Manufacture of amines by reacting alcohols with ammonia in the presence of a catalyst comprising zeolite FU-1 in which some or all of the protons of the zeolite have been replaced by monovalent cations, for example sodium. The process is especially useful for the manufacture of methylamines in which the proportions of monomethylamine and dimethylamine obtained are selectively increased in preference to trimethylamine.

10 Claims, No Drawings

MANUFACTURE OF AMINES FROM ALCOHOLS WITH ZEOLITE FU-1 CATALYSTS

The present invention relates to the manufacture of amines, in particular to the manufacture of the lower alkylamines.

Lower amines, for example the three methylamines, are prepared commonly by the reaction of ammonia, with the corresponding alcohol, for example methanol. The reaction is usually effected in the vapour phase over a catalyst at a temperature in the range 300° to 500° C. and at a pressure in the range 10 to 30 ats. The catalyst which is most frequently used, especially for the manufacture of methylamines, is a dehydration catalyst, for example an oxide such as thoria, alumina, zirconia or silica.

In our co-pending United Kingdom Patent Application No. 4655/78 we disclose a process for the manufacture of an amine comprising reacting an alcohol with ammonia at an elevated temperature in the presence of the hydrogen form of zeolite FU-1 or zeolite FU-1 in which some or all of the protons are replaced by bivalent or trivalent cations, for example by $Ca^{++}$ or by $Lu^{+++}$ or by $Ce^{+++}$.

Zeolite FU-1 is a silica-containing material which has the chemical composition (in terms of mole ratios of oxides):

$$0.6 \text{ to } 1.4 R_2O : Al_2O_3 :> 5 SiO_2 : 0 \text{ to } 40 H_2O$$

where R is a monovalent cation or 1/n of a cation of valency n and $H_2O$ is water of hydration additional to water notionally present when R is H. Zeolite FU-1 has an X-ray diffraction pattern substantially as shown in Table 1.

TABLE 1

| d(A) | 100 I/Io | d(A) | 100 I/Io |
|------|----------|------|----------|
| 9.51 | 31 | 4.48 | 6 |
| 8.35 | 8 | 4.35 | 13 |
| 6.92 | 28 | 4.07 | 19 |
| 6.61 | 9 | 4.00 | 9.4 |
| 6.26 | 9 | 3.89 | 13 |
| 5.25 | 16 | 3.73 | 28 |
| 4.61 | 63 | 3.68 | 3 |
|      |    | 3.44 | 100 |

These lines were measured on the sodium/tetramethylammonium form of FU-1 but the pattern of the hydrogen form differs negligibly from the above pattern. A more detailed X-ray diffraction pattern of zeolite FU-1 is to be found in our co-pending cognate UK patent application Nos. 46130/76 and 28267/77 which also contains a description of a method used for making the zeolite and its hydrogen form.

According to the present invention a process for the manufacture of an amine comprises reacting an alcohol with ammonia at an elevated temperature in the presence of a catalyst comprising Zeolite FU-1 in which some or all of the protons of the zeolite have been replaced by monovalent cations, for example sodium.

For use in the process according to the present invention zeolite FU-1 is converted from the form in which it is hydrothermally produced, in which form it contains oxides of alkali metal and of quaternary ammonium compound, by removal of the quaternary ammonium compound, for example by calcination in air, with retention to as large an extent as possible of the alkali metal. The alkali metal oxide content of zeolite FU-1 as used in the process of the invention is preferably equal to or greater than 1000 ppm w/w and more preferably is in the range 5000 to 25000 ppm, calculated as equivalent $Na_2O$. The quaternary ammonium content of the zeolite is preferably less than 2% calculated w/w as elemental carbon.

It is preferred to remove the quaternary compound by calcination in air, more preferably by calcination for an extended period, say of the order of 1 to 2 days, at a gradually increasing temperature.

Optionally, modified zeolite FU-1 for use in the process of this invention can be prepared from the hydrogen form of zeolite FU-1 by back-exchanging the hydrogen ions in the zeolite with alkali metal, e.g. sodium, cations using a solution of a suitable alkali metal compound.

The process of the invention is primarily of use for the preparation of amines from alkanols, and preferably the alkanol is a lower ($C_1$ to $C_6$) alkanol, in particular methanol. The amination reaction generally produces not one but a mixture of amines as one, two or three of the hydrogen atoms of the ammonia are replaced by organic groups. The type of amine which predominates can be influenced by the molar ratio of ammonia to alcohol which is used, high ratios favouring the mono-amine and low ratios the tri-amine. In practice, the molar ratio is usually at least 0.25:1 preferably in the range 0.5:1 to 5:1, more preferably 1:1 to 2:1. One of the advantages of the process of the present invention is that the catalyst tends to favour the production of mono- and di-amine at the expense of the tri-amine, an effect which is commercially beneficial as the mono- and di-amines are more readily saleable in the amounts in which they are usually produced than is the tri-amine.

The process is preferably carried out at an elevated temperature in the range 200° to 600° more preferably 300° to 500° C. and at a pressure preferably of 5 to 100, more preferably 10 to 30 atmospheres. Under these conditions the process for the production of lower amines such as the methylamines will take place in the vapour phase. Preferably such a reaction is carried out continuously, the alcohol and ammonia being led over a bed of the catalyst and the amines subsequently separated by distillation from the reaction product.

The invention will now be described further with reference to the following Examples.

EXAMPLE 1

Preparation of sodium form of zeolite FU-1

The reaction mixture had the composition:

$$3 Na_2O . 1.5 Q_2O . Al_2O_3 . 25 SiO_2 . 900 H_2O$$

and was made by suspending 3430 g of silica KS 300 (composition $Na_2O . 0.15 Al_2O_3 . 143 SiO_2 . 64 H_2O$) in a mixture of 2184 g of tetramethylammoniumhydroxide solution and 25 liters of water. Next a solution of 350 g of sodium aluminate and 257.4 g of sodium hydroxide in 5.25 liters of water was stirred in. Finally as seed 170 g of previously prepared FU-1, dried and ground to −100 mesh BSS, was stirred in. The mixture was reacted in a 44 liter stainless steel autoclave with stirrer speed 400 rpm for 12 hours at 180° C.

The product after filtration, washing and finally drying overnight at 120° C. was major FU-1 with no other phases detected. Its composition was:

$$0.94\ Na_2O\ .\ 1.5\ Q_2O\ .\ Al_2O_3\ .\ 25.5\ SiO_2\ .\ 6.4\ H_2O$$

It seems likely that the major cation is Na and that most of the tetramethylammonium (TMA) is occluded in the FU-1 lattice. X-ray diffraction data for this sample are shown in Table 2.

Zeolite FU-1 (5 g) was then compacted to a size of 1 to 2.5 mm mesh. This was calcined in air for a total of 40 hours, first for 16 hours at 350° C., then for 8 hours at 400° C., and finally for 16 hours at 450° C.

Runs using the conventional catalyst gave equilibrium mixtures of amines which corresponded, within experimental error, with theoretical compositions calculated using thermodynamic data. There was no such correspondence in runs using the sodium form of FU-1 zeolite. The catalyst is very selective towards the formation of monomethylamine and dimethylamine, an effect which is more pronounced at 380° C. than at either of the two higher temperatures used.

TABLE 3

| Run No. | Temp °C | Space Velocity ml of alcohol + ammonia/ml catalyst/hr | Ammonia:Methanol Molar Ratio A | B | Conversion % A | B | wt % Mono A | B | wt % Di A | B | wt % Tri A | B |
| --- | --- | --- | --- | --- | --- | --- | --- | --- | --- | --- | --- | --- |
| 1 | 380 | 1.0 | 1.15:1 | | 51.4 | | 39.0 | | 36.2 | | 24.8 | |
| 2 | 380 | 1.0 | | 1.1:1 | | 94.1 | | 17.6 | | 23.9 | | 58.4 |
| 3 | 380 | 1.0 | 1.0:1 | | 42.9 | | 37.8 | | 34.0 | | 28.1 | |
| 4 | 400 | 1.0 | | 1.0:1 | | 97.5 | | 13.6 | | 25.3 | | 61.1 |
| 5 | 400 | 0.5 | 1.65:1 | | 98.1 | | 26.3 | | 30.3 | | 43.4 | |
| 6 | 400 | 0.5 | | 1.75:1 | | 98.6 | | 21.4 | | 27.5 | | 51.1 |
| 7 | 420 | 1.0 | 1.6:1 | | 77.9 | | 35.4 | | 37.1 | | 27.6 | |
| 8 | 420 | 1.0 | | 1.5:1 | | 97.6 | | 20.6 | | 28.9 | | 50.5 |
| 9 | 380 | 1.0 | 3.7:1 | | 66.5 | | 54.4 | | 34.9 | | 10.7 | |
| 10 | 380 | 1.0 | | 3.65:1 | | 96.5 | | 33.2 | | 28.3 | | 38.5 |
| 11 | 420 | 1.0 | 3.5:1 | | 95.7 | | 41.6 | | 32.4 | | 26.0 | |
| 12 | 420 | 1.0 | | 3.6:1 | | 97.8 | | 37.0 | | 29.7 | | 33.3 |

A = Catalyst prepared above
B = Conventional silica-alumina catalyst

TABLE 2

| °2θ | d, A | Relative Intensity | °2θ | d, A | Relative Intensity |
| --- | --- | --- | --- | --- | --- |
| *5.4 | 16 | ~7 | 24.15 | 3.68₅ | ~17 |
| *6.1 | 14.5 | ~7 | 25.97 | 3.43 | 100 |
| 9.16 | 9.65 | 50 | 27.48 | 3.25 | ~4 |
| 10.7 | 8.3 | ~3 | 28.40 | 3.14 | ~2 |
| 12.80 | 6.92 | 27 | 30.53 | 2.93 | 6 |
| 13.4 | 6.6 | ~2 | 33.63 | 2.66₅ | 2 |
| 14.96 | 5.92 | 2 | 34.08 | 2.63 | 2 |
| 15.40 | 5.75 | 2 | 35.48 | 2.53 | ~2 |
| 16.88 | 5.25 | 15 | 36.38 | 2.47 | ~2 |
| 17.5 | 5.1 | ~2 | 37.30 | 2.41 | ~3 |
| 19.26 | 4.61 | 50 | 43.23 | 2.09 | ~2 |
| 20.7 | 4.3 | ~2 | 44.78 | 2.02₅ | 6 |
| 21.80 | 4.08 | ~11 | 48.66 | 1.871 | 9 |
| 23.77 | 3.74 | ~23 | 49.53 | 1.840 | 6 |
| | | | 50.41 | 1.810 | ~2 |
| | | | 51.22 | 1.783 | 4 |
| | | | 52.87 | 1.732 | ~2 |

~ Approximate Relative Intensity (because of interference from adjacent lines)
*These lines may be due to scatter

EXAMPLE 2

Manufacture of Methylamines

The catalyst was tested using a small scale continuous laboratory unit coupled to in-line gas-liquid chromatography analysers. The compacted catalyst (4 ml, 2 g) was contained in a stainless steel tube reactor 15 cm long and with an internal diameter of 6 mm. A stream of ammonia was passed through the reactor which was heated to about 400° C. After about 2 hours at this temperature, methanol was introduced to the feed stream and reaction conditions were adjusted to those shown in Table 3. The reaction pressure was about 280 lb/sq. in. gauge.

The results are shown in Table 3 including results obtained under similar conditions in the same reactor using a non-crystalline silica/alumina catalyst of a type commonly used in methylamines manufacturing processes.

EXAMPLE 3

Manufacture of Methylamines

A number of experiments on the production of methylamines were carried out using various catalysts. Runs were made using (1) the hydrogen form of zeolite FU-1 containing virtually no sodium (2) zeolite FU-1 containing a relatively small amount of sodium (3) zeolite FU-1 containing a relatively large amount of sodium and (4) a conventional silica-alumina catalyst.

A range of sodium form zeolite FU-1 catalysts were prepared in which the Na+ level was gradually increased by controlled ion-exchange treatment of hydrogen form zeolite FU-1 in which the tetramethylammonium ion had been left undisturbed in the internal sites, and then removed before catalytic use by calcination in air either with or without pre-calcination in ammonia.

The methylamines were prepared by the reaction of methanol and ammonia and conditions were similar to those used in Example 2. The reaction pressure was about 250 lb/sq. in. gauge. The reaction conditions and results obtained for each catalyst are summarised in Table 4.

As in Example 2, runs using the conventional catalyst K gave equilibrium mixtures of methylamines which corresponded, within experimental error, with theoretical compositions calculated using thermodynamic data.

The runs using catalysts C and D, the hydrogen forms of zeolite FU-1, show selective producton of monomethylamine rather than dimethylamine whereas runs with catalysts F, G, H and J, the sodium forms of zeolite FU-1, show selective production of dimethylamine (as well as monomethylamine) which is dependent on the level of sodium present.

The selectivity to monomethylamine shown by catalysts C and D is relatively small. The reason is believed to be that the effect of steric factors inside the pores or adjacent to the active sites within the cages of the zeolite, which appears to limit the release of trimethylamine but not mono- or di-methylamine from the pores, is partially or predominantly obscured by the normal sterically-unrestrained amination reaction on the zeolite surface sites.

vated temperature in the presence of a catalyst comprising zeolite FU-1 in which some or all of the protons of the zeolite have been replaced by monovalent cations.

TABLE 4

| | | AMINATION CONDITIONS | | | AMINATION RESULTS | | | |
|---|---|---|---|---|---|---|---|---|
| CATALYST CODE | % Na (as Na₂O) | Temp °C. | Total Molar Space Velocity moles/MeOH cat/hr | NH₃/ Methanol Molar Ratio | Conversion % | Product Composition (% molar) | | |
| | | | | | | Mono | Di | Tri |
| C | 0.05 | 400 | 0.03 | 1.8 | 98.2 | 38.1 | 28.1 | 33.9 |
| D | 0.08 | 380 | 0.03 | 1.8 | 63.9 | 44.4 | 26.3 | 29.3 |
| | | 400 | 0.03 | 1.8 | 86.2 | 42.0 | 27.0 | 31.0 |
| | | 400 | 0.03 | 1.5 | 93.8 | 37.8 | 27.5 | 34.7 |
| | | 420 | 0.03 | 1.5 | 98.6 | 37.2 | 27.5 | 35.3 |
| E | 0.88 | 380 | 0.03 | 3.5 | 95.0 | 53.9 | 25.0 | 21.1 |
| | | 400 | 0.03 | 3.5 | 99.5 | 48.9 | 24.2 | 26.9 |
| F | 1.6 | 380 | 0.02 | 1.6 | 95.8 | 39.7 | 33.4 | 26.9 |
| G | 1.75 | 400 | 0.02 | 1.5 | 95.5 | 48.9 | 27.7 | 23.4 |
| | | 400 | 0.02 | 1.5 | 91.0 | 41.8 | 27.8 | 30.4 |
| | | 420 | 0.02 | 1.5 | 98.3 | 38.2 | 26.6 | 35.2 |
| H | 2.35 | 380 | 0.025 | 2.0 | 84.7 | 48.8 | 31.3 | 19.9 |
| | | 400 | 0.025 | 2.0 | 97.4 | 44.8 | 29.5 | 25.6 |
| | | 400 | 0.025 | 1.5 | 86.6 | 45.2 | 30.4 | 24.3 |
| | | 420 | 0.025 | 1.5 | 97.2 | 39.4 | 28.0 | 32.6 |
| J | 2.79 | 380 | 0.2 | 2.1 | 85.0 | 50.4 | 31.9 | 17.7 |
| | | 400 | 0.2 | 2.0 | 93.9 | 46.9 | 30.8 | 22.3 |
| | | 400 | 0.2 | 1.5 | 63.0 | 49.0 | 30.6 | 20.4 |
| | | 420 | 0.2 | 1.5 | 84.9 | 42.1 | 30.0 | 27.8 |
| K | Theoretical Product Compositions | 380 | | 3.5 | >99.5 | 51.1 | 25.6 | 23.4 |
| | | 400 | | 3.5 | 99.5 | 53.3 | 25.7 | 21.0 |
| | | 380 | | 2.0 | 99.5 | 40 | 27 | 33 |
| | | 400 | | 2.0 | 99.5 | 42 | 27.5 | 30.5 |
| | | 400 | | 1.5 | 99.5 | 35.5 | 27.5 | 37 |
| | | 420 | | 1.5 | 99.5 | 37 | 28.5 | 34.5 |

Catalysts C and D = Zeolite FU-1 in hydrogen form
E = Low sodium zeolite FU-1
F, G, H and J = High sodium zeolite FU-1
K = Conventional silica-alumina The Applicants believe that the results in Table 4 indicate that to obtain good selectivity to dimethylamine it is necessary to block most of the surface acidic sites and thus permit amination to occur only within the pores. Although the Applicants used sodium to block the surface sites other poisons can also be used although the Applicants found that in general other poisons were either too efficient thereby giving low catalytic activity or had adverse effects on the mechanical properties of the catalyst. The use of ion-exchange with monovalent cations is smooth, repeatable and effective.

Partial replacement of the acidic sites has an expected adverse effect on amination activity. However, this can be substantially overcome by operation at moderately higher temperatures, say 10° to 30° C. higher, than for unmodified catalysts. Nevertheless it is preferred to operate at as low temperature as possible consistent with sound economics since selectivity tends to decrease with increasing temperature (as can be seen in Table 4). The Applicants believe that this may be a result of molecular relaxation of the reactant or product molecules, or of the zeolite cages themselves.

Thus the present invention illustrates that the presence of sodium in zeolite FU-1 catalysts is not disadvantageous even though it has been common practice hitherto to reduce the sodium content of zeolites such as zeolite FU-1 to very low levels because of the suspected disadvantages of using zeolite catalysts containing sodium.

We claim:

1. A process for the manufacture of an amine which comprises reacting an alcohol with ammonia at an elevated temperature in the presence of a catalyst comprising zeolite FU-1 in which some or all of the protons of the zeolite have been replaced by monovalent cations.

2. A process as claimed in claim 1 in which some or all of the protons of the zeolite have been replaced by sodium cations.

3. A process as claimed in claim 1 in which the alkali metal oxide content of the catalyst is equal to or greater than 1000 ppm w/w, calculated as equivalent Na₂O.

4. A process as claimed in claim 3 in which the alkali metal oxide content of the catalyst is in the range 5000 to 25000 ppm w/w, calculated as equivalent Na₂O.

5. A process as claimed in claim 1 in which the quaternary ammonium content of the zeolite is less than 2% calculated w/w as elemental carbon.

6. A process as claimed in claim 1 in which the alcohol is a lower alkanol containing 1 to 6 carbon atoms.

7. A process as claimed in claim 6 in which the alcohol is methanol.

8. A process as claimed in claim 1 in which the molar ratio of ammonia to alcohol is at least 0.25:1.

9. A process as claimed in claim 8 in which the molar ratio of ammonia to alcohol is in the range 0.5:1 to 5:1.

10. A process as claimed in claim 1 for the production of methylamines in which ammonia is reacted with methanol at a reaction temperature in the range 300° to 500° C., at a reaction pressure in the range 10 to 30 atmospheres, and at a molar ratio of ammonia to methanol in the range 0.5:1 to 5:1 in the presence of zeolite FU-1 in which some at least of the protons of the zeolite have been replaced by sodium cations, the catalyst containing an alkali metal oxide content in the range 5000 to 25000 ppm w/w, calculated as equivalent Na₂O.

* * * * *